Figure 1:
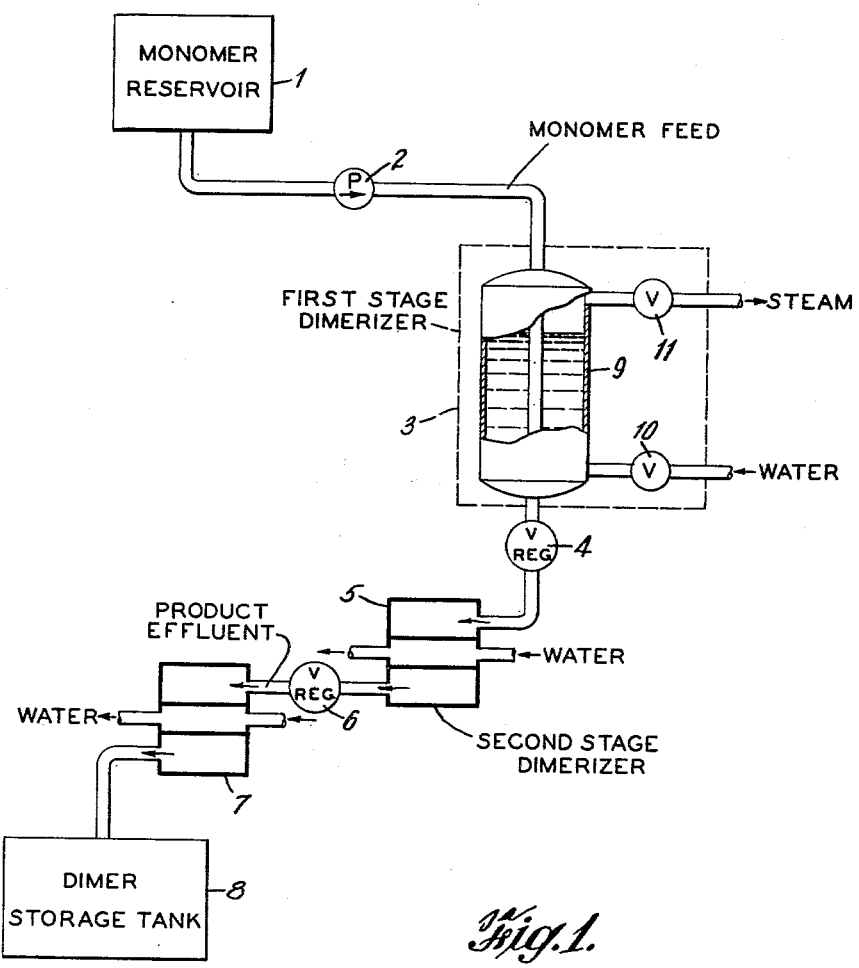

July 20, 1965

S. E. PARRISH ETAL 3,196,188

CYCLOPENTADIENE DIMERIZATION PROCESS

Filed Nov. 28, 1961

2 Sheets-Sheet 1

INVENTORS
STANTON E. PARRISH
EUGENE F. WILLIAMSON
BY Francis M. Fazio
ATTORNEY

United States Patent Office

3,196,188
Patented July 20, 1965

3,196,188
CYCLOPENTADIENE DIMERIZATION
PROCESS
Stanton E. Parrish, South Charleston, and Eugene F. Williamson, St. Albans, W. Va., assignors to Union Carbide Corporation, a corporation of New York
Filed Nov. 28, 1961, Ser. No. 155,362
16 Claims. (Cl. 260—666)

This invention relates to a novel process for the dimerization of cyclopentadienes. More particularly, this invention relates to a process for dimerizing cyclopentadiene monomers whereby high yields of the dimer are obtained to the substantial exclusion of polymers of the cyclopentadiene monomer higher than the dimer, such as the trimer, the tetramer, and the like. This invention further relates to a process for producing high purity cyclopentadiene dimers from concentrated monomer feed stocks at high rates of conversion of monomer to dimer.

The liquid phase, batch-wise dimerization of cyclopentadiene monomers, such as cyclopentadiene, methylcyclopentadiene, ethylcyclopentadiene, and the like at temperatures of from ambient temperature to 100° C. is well known. This type of dimerization has not been commercially attractive, however, because relatively long reaction times are required to achieve high degrees of conversion of monomer to dimer at these temperatures. For example, over 4½ hours are required at about 50° C. to achieve a conversion of cyclopentadiene to dicyclopentadiene of 60 percent. Although higher temperatures increase the reaction rate for the dimerization, the rate of formation of polymers higher than the dimer was also expected in increase. These polymers, such as the trimer, the tetramer, and the like, are difficult to crack back to the monomer and, thus, result in a decrease in the efficiency of the dimerization. Furthermore, the dimerization of the cyclopentadienes is a highly exothermic reaction, evolving about 335 B.t.u.'s per pound of monomer for the dimerization of cyclopentadiene, and, as the reaction rate increases, it is increasingly necessary to rapidly dissipate the heat of reaction to prevent overheating of the reaction mixture, which in turn would result in increased polymer formation and may generate pressures sufficient to rupture the reaction vessel.

As a result of these problems, the dimerization of cyclopentadienes usually has been conducted at temperatures of less than 100° C., with the dimerization being carried to only about 50 percent conversion of monomer to dimer. Furthermore, because the problem of heat build-up was particularly prevalent where the feed stock was a concentrated monomer, dilute cyclopentadiene feed stocks were usually employed.

Recently, a step-wise process was developed in an effort to minimize polymer formation, increase dimer production rates, and, at the same time utilize concentrated cyclopentadiene feed stocks. This process essentially comprised conducting an initial dimerization at a temperature of from 50° C. to 100° C. for at least 1 hour, and preferably for at least 3 hours, to achieve a conversion of monomer to dimer of from 60 to 80 percent. The partially dimerized cyclopentadiene then was subjected to successively higher temperatures in the range of from 100° C. to 140° C. for shorter periods of time to complete the dimerization. It was believed that this particular temperature and time sequence was necessary to prevent the formation of polymers higher than the dimer and at the same time achieve high yields of the dimer.

Applicants have discovered by this invention a novel process by which a concentrated cyclopentadiene monomer is dimerized in the liquid phase to produce a high purity dimer at higher conversion rates than heretobefore possible to the substantial exclusion of polymers higher than the dimer. The process of this invention essentially comprises partially dimerizing a concentrated liquid cyclopentadiene monomer at a temperature of at least 110° C. for a short period of time and completing the dimerization at temperatures of less than 110° C. for longer periods of time. Thus, the process of this invention employs a time-temperature relationship that is the reverse of that employed in the step-wise process previously described. Nevertheless, by operating in accordance with the process of this invention, high purity cyclopentadiene dimers are produced from concentrated monomer feed stocks at higher production rates of the dimer and with much less polymer formation than with the previous process.

The process of this invention can be employed for the dimerization of cyclopentadiene monomers having from 5 to 7 carbon atoms, such as cyclopentadiene, methylcyclopentadiene, dimethylcyclopentadiene, and ethylcyclopentadiene, with cyclopentadiene being the preferred monomer. The feed can be pure monomer or can contain the monomer in admixture with other organic compounds, such as those present in a cyclopentadiene fraction produced by fractional distillation of petroleum pyrolysis products. Although the cyclopentadiene need not be concentrated in the feed the process of this invention is most beneficial where the feed stock is a concentrated cyclopentadiene monomer, comprising at least about 65 percent of the feed.

For convenience in discussion, the process of this invention will be considered as being comprised of two stages; a first stage, partial dimerization at temperatures of at least 110° C., and a second stage dimerization conducted at reduced temperatures, whereby a product containing at least 90 weight percent dimer, and preferably at least 95 weight percent dimer, based on monomer in the feed, is obtained.

The partial dimerization, or first stage of the process of this invention, is conducted at a temperature of from about 110° C. to about 160° C., with temperatures of from about 125° C. to about 145° C. preferred. The utilization of these temperatures is considered unusual in view of the known tendency of high polymers to form at such high temperatures. Applicants have unexpectedly and surprisingly found, however, that the rate of polymerization does not increase as rapidly as believed and that the relative proportion of polymer to dimer may actually decrease at these temperatures because of the much greater relative increase in the rate of dimerization as compared with the increase in the rate of polymerization. As a result, high conversions of cyclopentadiene monomers to dimer are readily achieved in the first stage of the process of this invention while very little polymer higher than the dimer is formed.

To maintain the cyclopentadiene monomer in the liquid phase at the temperatures employed in this first stage, pressures of at least about 90 p.s.i.g. are employed. In general, pressures of from about 90 to about 235 p.s.i.g. are employed, with pressures of from 130 to about 180 p.s.i.g. preferred.

The conversion of cyclopentadiene to dicyclopentadiene in the first stage of the process of this invention is carried to at least 50 percent. Although conversions of monomer to dimer of up to 90 percent or more are readily achieved without significant high polymer formation, it is preferred that conversion levels of from about 60 to about 80 percent are maintained. To achieve such conversion levels reaction times of from about 3 to about 30 minutes are employed, with reaction times of from about 5 to about 10 minutes preferred.

Although any type of reactor having sufficient heat capacity to remove the heat of reaction of the initial partial dimerization can be employed to carry out the first stage of the process of this invention, it has been found that one type of reactor is particularly suitable. This type reaction is a shell and tube heat exchanger, with the dimerization being conducted inside the tubes of the heat exchanger. Various types of known shell and tube heat exchangers can be employed, such as single or multi-tube heat exchangers having various tube configurations, such as straight, spiral, or finned tubes, and the like. In general, it is preferred that the ratio of the inside surface area of the tubes to the volume of the tubes is from about 45 square feet per cubic foot to about 180 square feet per cubic foot, with a ratio of 105 square feet of surface area per cubic foot especially preferred. Although higher and lower ratios can be employed, ratios higher than about 180:1 result in lower production rates per tube and ratios lower than about 45:1 do not permit ready removal of the heat of reaction and high polymers are likely to form.

The shell side of the heat exchanger contains a heat exchange medium which is present in both the liquid and vapor phases; that is, a boiling liquid. In order to maintain dimerization temperatures of 110° C. to 160° C., the heat exchange medium in the shell side of the heat exchanger is generally maintained at a temperature of from about 100° C., or lower, to about 150° C., or higher, with temperatures of from about 110° C. to about 135° C. preferred. Accordingly, any fluid that boils at these temperatures, either at atmospheric, sub-atmospheric, or super-atmospheric pressures, can be employed as the heat exchange medium. Although water is the preferred heat exchange medium because of its low cost and high heat of vaporization, other fluids, such as dioxane, propyl acetate, n-butanol, isobutanol, octane, nonane, toluene, xylene, the monomethyl ether of ethylene glycol, the monoethyl ether of ethylene glycol, the diethyl ether of ethylene glycol, the monopropyl ether of ethylene glycol, and the like, also can be employed.

To maintain good temperature control of the dimerization, the liquid phase of the heat exchange medium should occupy from about 50 to about 95 percent, and preferably from about 85 to about 90 percent, of the volume of the shell side of the heat exchanger. As the heat exchange medium boils off, additional liquid is introduced to the shell side of the heat exchanger to maintain the desired liquid level. When a reactor of this type is employed the cyclopentadiene monomer is introduced to the tube side of the heat exchanger at a point that is higher than the level of the liquid heat exchange medium in the shell side of the heat exchanger and the partially dimerized cyclopentadiene is withdrawn at a point below the liquid level of the heat exchange medium. By employing this particular mode of operation the dimerization is initiated by the heat released by the condensing vapor of the heat exchange medium and the heat evolved by the dimerization is removed by the boiling heat exchange medium.

It is an advantage of the utilization of this type of reactor that it enables good control over the reaction. If the reaction temperature drops, thereby reducing the reaction rate, the pressure on the boiling heat exchange medium can be increased to increase the rate of condensation of the vapors, thereby increasing the release of the latent heat of vaporization, which rapidly heats up the reaction mixture and increases the reaction rate. On the other hand, if the reaction rate increases to a point where a run-away reaction may occur, by reducing the pressure on the boiling heat exchange medium the rate of vaporization is increased, which, in turn, rapidly withdraws the necessary heat of vaporization from the dimerizing mixture, thereby rapidly reducing the rate of dimerization and bringing the reaction back under control.

The partially dimerized cyclopentadiene effluent from the first stage of the process of this invention is conducted to the second stage where it is cooled to a temperature below 110° C. and maintained at that temperature for a period of time sufficient to complete the dimerization of the cyclopentadiene monomer to its dimer. By the phrase "completion of dimerization" or variations thereof is meant attaining a conversion of cyclopentadiene monomer to dimer of from about 90 to about 100 percent, and preferably from about 95 to about 100 percent. The remaining cyclopentadiene monomer is not considered to be an impurity in the product because it will readily dimerize at room temperature to quantitatively complete the dimerization. Because the cyclopentadiene monomer is diluted by the dimer, the rate of dimerization will be slow and there is no danger of heat build-up which would result in the formation of high polymers or possibly rupture storage containers. Furthermore, concentrations of from about 2 to about 10 weight percent of cyclopentadiene monomer in the product dimer often are desirable. For example, dicyclopentadiene is a solid at room temperature, but the addition of at least 2 weight percent of cyclopentadiene to dicyclopentadiene produces a mixture which melts at a temperature of about 66° F. or lower. Thus, when conversion levels of cyclopentadiene to dicyclopentadiene of less than 98 percent are achieved, the product is a liquid at room temperature which is easily handled prior to storage.

Although temperatures as low as about 25° C., or lower, can be employed to complete the dimerization of the cyclopentadiene monomer, the rate of dimerization is low at such temperatures and long periods of time are necessary to complete the dimerization. Accordingly, it is preferred that the second stage be conducted at elevated temperatures of from about 50° C. to about 110° C., with temperatures of from about 80° C. to about 100° C. especially preferred. To maintain the reaction mixture in the liquid phase at these elevated temperatures, pressures of from about 5 to about 90 p.s.i.g. are employed, with pressures of from about 35 to about 66 p.s.i.g. preferred.

When the second stage is conducted at the elevated temperatures the overall conversion of monomer to dimer can be carried to about 90 to about 95 percent or more, and preferably to at least about 95 percent completion, based upon cyclopentadiene monomer in the initial feed. When the first stage dimerization has been carried to a conversion of 50 percent, or more, times of from about 1 hour to about 3 hours, and preferably from about 1.2 to about 1.8 hours, are employed in the second stage to achieve an overall conversion of monomer to dimer of about 95 percent.

Although the completion of the dimerization can be conducted at a constant temperature, it is also within the contemplation of this invention that the second stage can be conducted in a series of steps at successively reduced temperatures. The only requirement is that the temperature employed in these stages is less than 110° C.

The reactor that is employed for the second stage of the process of this invention can be any equipment capable of removing the heat of dimerization, such as shell and tube heat exchangers, tanks equipped with cooling coils, and the like. Because the concentration of cyclopentadiene monomer is low, the rate of dimerization is lower than in the first stage and no specialized equipment is necessary or desirable.

If the cyclopentadiene feed stock contains impurities such as benzene, isoprene, pentadienes, and the like the reaction product can be recovered by distillation according to procedures known in the art. If the feed stock is substantially pure cyclopentadiene, however, the reaction product can be sent to storage directly without purification.

As a modification of the process of this invention, the partially dimerized cyclopentadiene from the first stage can be subjected to a flash distillation, whereby the cyclopentadiene monomer is vaporized to leave substantially pure dimer as a product. When such a procedure is employed the flash distillation is conducted at temperatures of from about 100° C. to about 160° C. and pressures of from about 0 p.s.i.g. to about 60 p.s.i.g.

The unreacted cyclopentadiene monomer thus recovered can be recycled to the first-stage partial dimerization if desired. Where, however, the feed stock contains substantial amounts of impurities, such as benzene, isoprene, pentadienes, and the like, a fractional distillation is required to remove such impurities and prevent their build-up to concentrations where they would react with the cyclopentadiene monomer or substantially dilute the cyclopentadiene feed.

FIGURE 1 is a schematic representation of the preferred method for carrying out the process of this invention.

With reference to FIGURE 1, the apparatus consists of monomer reservoir 1, with cooling means, not shown, to maintain the cyclopentadiene monomer feed stock at a temperature of $-20°$ C. to $+10°$ C., connected in series with pump 2, first stage dimerizer 3, first pressure regulating valve 4, second stage dimerizer 5, second pressure regulating valve 6, heat exchanger 7, and dimer storage tank 8.

First stage dimerizer 3 consists of a vertically-disposed shell and tube heat exchanger 9, with the cyclopentadiene inlet being located at the top of the tube side of said heat exchanger 9. Water is passed through valve 10 to the bottom of the shell side of heat exchanger 9 and steam is removed from the top of the shell side of heat exchanger 9 through valve 11, which is regulated to maintain a pressure of 10 p.s.i.g. in the shell side. The temperature of the shell side of heat exchanger 9 is maintained at about 115° C. The flow of water to the shell side of heat exchanger 9 is regulated by valve 10 to maintain the water level in the shell side of heat exchanger 9 at approximately seven-eights of the height of heat exchanger 9. First pressure regulating valve 4 is regulated to maintain a pressure of about 125 p.s.i.g. in the tubes of heat exchanger 9.

The second stage dimerizer consists of a horizontally-disposed shell and tube heat exchanger 5. The partially dimerized effluent from heat exchanger 9 is passed through the shell side of heat exchanger 5 which is maintained at a temperature of 100° C. by water passing through the tube side of heat exchanger 5. Second pressure regulating valve 5 is regulated to maintain a pressure of 100 p.s.i.g. on the reaction mixture in heat exchanger 5.

The product effluent from heat exchanger 5 is then passed through valve 6, and heat exchanger 7, wherein it is cooled to 20° C., and then to dimer storage tank 8.

Figure 2:
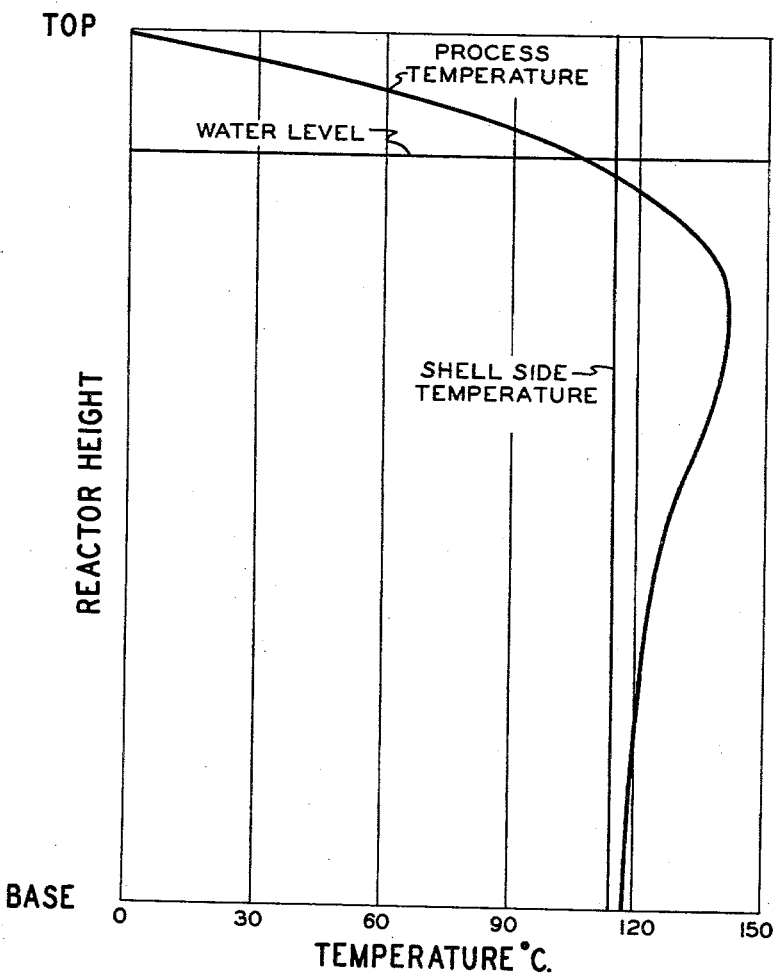

FIGURE 2 is a graphical representation of the relation of the reaction temperature to reactor height in first stage dimerizer 3.

With reference to FIGURE 2, the cyclopentadiene is fed to the top of the reactor at the storage temperature, about 0° C. The feed is heated and the dimerization is initiated by the latent heat of vaporization released by the condensing steam. After the reaction is initiated, the reaction mixture in the tubes passes below the water level in the shell side of the heat exchanger, and the heat of dimerization is absorbed and the reaction mixture is cooled by the boiling water, the reaction mixture attaining a maximum temperature of about 135° C. and thereafter being cooled to about 115° C. at the outlet of the heat exchanger.

The following examples are illustrative. In each example the conversion of monomer to dimer was determined by a mass spectrometer analysis and the amount of high polymer formed was determined from the residue remaining after vacuum distillation of the monomer and dimer from the reaction product.

*Example I*

The apparatus employed corresponded generally to that shown in FIG. 1. The first stage dimerizer consisted of a vertically-disposed 1—1 shell and tube heat exchanger, eight feet in length by 16 inches in diameter and containing 207 tubes of ⅝-inch, 14 BWG copper tubing, with the cyclopentadiene inlet being located at the top of the tube side of the heat exchanger. Water was passed into the bottom of the shell side of the heat exchanger and steam was removed from the top of the shell side of the heat exchanger, a pressure of 10 p.s.i.g. and a temperature of 115° C. being maintained in the shell side. The flow of water to the shell side of the heat exchanger was regulated to maintain the water level in the shell side of the heat exchanger at approximately seven-eighths of the height of the heat exchanger.

The second stage dimerizer consisted of a series of six horizontally-disposed shell and tube heat exchangers, each exchanger being 18 feet in length, having an 8⅝ inch diameter shell, and containing seven 2-inch diameter tubes. Partially dimerized cyclopentadiene from the first stage dimerizer was passed through the shell side of these heat exchangers, which were maintained at a temperature of 100° C. by water passing through the tube side of the heat exchangers.

A cyclopentadiene feed stock, containing 91.1 weight percent cyclopentadiene was fed to the first stage dimerizer at a rate of 850 pounds per hour, resulting in a residence time in the first stage dimerizer of 7.9 minutes (0.13 hour). The dimerizing cyclopentadiene reached a maximum temperature of about 135° C. in the first stage dimerizer. The reaction pressure was maintained at 125 p.s.i.g.

A conversion of 74 weight percent of cyclopentadiene to dicyclopentadiene was achieved in the first stage dimerizer, with only 0.05 weight percent of the cyclopentadiene in the feed forming polymers higher than dicyclopentadiene.

The partially dimerized cyclopentadiene effluent from the first stage dimerizer was passed through the shell side of the heat exchangers employed as the second stage dimerizer and was maintained at a temperature of 100° C. and a pressure of 100 p.s.i.g., the residence time in the second stage dimerizer being 1.5 hours.

Analysis of the effluent from the second stage dimerizer showed that a total conversion of cyclopentadiene to dicyclopentadiene of 95 percent was achieved, with 0.18 weight percent of the cyclopentadiene charge forming polymers of cyclopentadiene higher than dicyclopentadiene.

*Example II*

Employing apparatus and procedures similar to those described in Example I, a cyclopentadiene feed stock containing 93.9 weight percent cyclopentadiene was fed to the first stage dimerizer at a rate of 1004 pounds per hour, resulting in a residence time of 6.6 minutes (0.11 hour) in the first stage dimerizer. The maximum temperature of the dimerizing mixture in the first stage was 142° C. The first stage dimerization resulted in a conversion of monomer to dimer of 88 percent, with 0.05 weight percent of the cyclopentadiene charged forming polymers higher than the dimer.

The reaction effluent from the first stage dimerizer was passed through the second stage dimerizer at a temperature of 90° C., employing a residence time of 1.5 hours. Analysis of the reaction effluent from the second stage dimerizer showed a conversion of cyclopentadiene to dicyclopentadiene of 95 percent, with 0.24 weight percent of the cyclopentadiene charged forming polymers higher than dicyclopentadiene.

*Example III*

Employing apparatus and procedures similar to those described in Example I, a cyclopentadiene feed stock containing 92.9 weight percent cyclopentadiene was fed to the first stage dimerizer at a rate of 929 pounds per hour, resulting in a residence time of 7.2 minutes (0.12 hour) in the first stage dimerizer. The maximum temperature in the first stage dimerizer was 126° C. The first stage dimerization resulted in a conversion of monomer to dimer of 57 percent, with about 0.05 weight percent of the cyclopentadiene charged forming polymers higher than the dimer.

The reaction effluent from the first stage dimerization was passed through the second stage dimerizer at a temperature of 90° C., employing a residence time of 1.2 hours. Analysis of the reaction effluent from the second stage dimerizer showed a total conversion of cyclopentadiene to dicyclopentadiene of 93 percent, with 0.16 percent of the cyclopentadiene charged forming polymers higher than dicyclopentadiene.

For purposes of comparison, the results of the above examples are set forth in tabular form below, showing the reaction conditions and effluent compositions for each stage.

| Example No | I | II | III |
|---|---|---|---|
| Stage 1: | | | |
| Feed rate, pounds/hour | 850 | 1,004 | 929 |
| Cyclopentadiene in feed, weight percent | 91.1 | 93.9 | 92.9 |
| Reaction Conditions— | | | |
| Temperature, °C.[1] | 135 | 142 | 126 |
| Pressure, p.s.i.g. | 125 | 125 | 125 |
| Residence time, hours | 0.13 | 0.11 | 0.12 |
| Reaction Effluent—[2] | | | |
| Monomer, percent | 26 | 12 | 43 |
| Dimer, percent | 74 | 88 | 57 |
| Polymer, percent | 0.05 | 0.05 | 0.05 |
| Stage 2: | | | |
| Reaction Conditions— | | | |
| Temperature, °C | 100 | 90 | 90 |
| Pressure, p.s.i.g. | 100 | 100 | 100 |
| Residence time, hours | 1.5 | 1.5 | 1.2 |
| Reaction Effluent—[2] | | | |
| Monomer, percent | 5 | 5 | 7 |
| Dimer, percent | 95 | 95 | 93 |
| Polymer, percent | 0.18 | 0.24 | 0.16 |

[1] Maximum temperature.
[2] Based on cyclopentadiene charged.

From the table it can be seen that the first stage of the process of this invention permits conversions of cyclopentadiene to dicyclopentadiene of from about 57 to about 88 percent in from 0.11 to 0.13 hour, with only 0.05 percent of the cyclopentadiene charged forming polymers higher than dicyclopentadiene, and that the two stage process of this invention permits overall conversions of from 93 to 95 percent in from 1.3 to 1.6 hours, with less than 0.25 of the cyclopentadiene charged forming polymers higher than the dimer.

What is claimed is:

1. The process for the dimerization of a concentrated cyclopentadiene monomer having from 5 to 7 carbon atoms which comprises heating said monomer in the liquid phase and in the substantial absence of monomer vapors at a temperature of from 110° C. to 160° C. for from 3 to 30 minutes, whereby at least 50 percent of said monomer is converted to its dimer and the formation of cyclopentadiene polymers higher than the dimer is minimized.

2. The process as claimed in claim 1 wherein said cyclopentadiene monomer is cyclopentadiene.

3. The process for the dimerization of a concentrated cyclopentadiene monomer having from 5 to 7 carbon atoms which comprises passing said monomer in the liquid phase and in the substantial absence of monomer vapors through the tube side of a vertically-disposed shell and tube heat exchanger; maintaining in the shell side of said heat exchanger a boiling heat exchange medium at a temperature of from 100° C. to 150° C., the liquid phase of said heat exchange medium occupying from 50 to 95 percent of the shell side of said heat exchanger; said monomer being fed to the tube side of said heat exchanger at a point higher than the liquid level of said heat exchange medium and the reaction product being removed from the tube side of said heat exchanger at a point below the liquid level of said heat exchange medium; the residence time of the cyclopentadiene monomer in said heat exchanger being from 3 to 30 minutes, whereby at least 50 percent of said monomer is converted to its dimer and the formation of cyclopentadiene polymers higher than the dimer is minimized.

4. The process as claimed in claim 3 wherein said cyclopentadiene monomer is cyclopentadiene.

5. The process for the dimerization of a concentrated cyclopentadiene monomer having from 5 to 7 carbon atoms which comprises heating said monomer in the liquid phase and in the substantial absence of monomer vapors at a temperature of from 110° C. to 160° C. for from 3 to 30 minutes, whereby at least 50 percent of said monomer is converted to its dimer and thereafter cooling the resulting reaction product to a temperature of less than 110° C. whereby at least 90 percent of said monomer is converted to its dimer; and whereby the formation of cyclopentadiene polymers higher than the dimer is minimized.

6. The process as claimed in claim 5 wherein said cyclopentadiene monomer is cyclopentadiene.

7. The process for the dimerization of a concentrated cyclopentadiene monomer having from 5 to 7 carbon atoms which comprises passing said monomer in the liquid phase and in the substantial absence of monomer vapors through the tube side of a shell and tube heat exchanger, maintaining in the shell side of said heat exchanger a boiling heat exchange medium at a temperature of from 100° C. to 150° C., the liquid phase of said heat exchange medium occupying from 50 to 95 percent of the shell side of said heat exchanger, said monomer being fed to the tube side of said heat exchanger at a point higher than the liquid level of said heat exchange medium and the reaction product being removed from the tube side of said heat exchanger at a point below the liquid level of said heat exchange medium, the residence time of said monomer in said heat exchanger being from 3 to 30 minutes, whereby at least 50 percent of said cyclopentadiene monomer is converted to its dimer, and thereafter cooling said reaction product to a temperature of less than 110° C. whereby at least 90 percent of said monomer is converted to its dimer; and whereby the formation of cyclopentadiene polymers higher than the dimer is minimized.

8. The process as claimed in claim 7 wherein said cyclopentadiene monomer is cyclopentadiene.

9. The process as claimed in claim 3 wherein said heat exchange medium is water.

10. The process as claimed in claim 7 wherein said heat exchange medium is water.

11. The process for the dimerization of a concentrated cyclopentadiene monomer having from 5 to 7 carbon atoms which comprises feeding said monomer in the liquid phase and in the substantial absence of monomer vapors to a dimerization zone; said dimerization zone being in heat exchange relationship with a heat exchange zone maintained at a temperature of from 100° C. to 150° C. and containing a boiling heat exchange medium; said monomer being fed to said dimerization zone at a point higher than the liquid level of said heat exchange medium in said heat exchange zone, and the reaction product being removed from the dimerization zone at a point below the liquid level of said heat exchange medium; the residence time of the cyclopentadiene monomer in said dimerization zone being from 3 to 30 minutes, whereby at least 50 percent of said monomer is converted to its dimer and the formation of cyclopentadiene polymers higher than the dimer is minimized.

12. The process as claimed in claim 11 wherein said cyclopentadiene monomer is cyclopentadiene.

13. The process as claimed in claim 11 wherein said heat exchange medium is water.

14. The process for the dimerization of a concentrated cyclopentadiene monomer having from 5 to 7 carbon atoms which comprises feeding said monomer in the liquid phase and in the substantial absence of monomer vapors to a dimerization zone; said dimerization zone being in heat exchange relationship with a heat exchange zone maintained at a temperature of from 100° C. to 150° C. and containing a boiling heat exchange medium; said monomer being fed to said dimerization zone at a point higher than the liquid level of said heat exchange medium in said heat exchange zone, and the reaction product being removed from the dimerization zone at a point below the liquid level of said heat exchange medium; the residence time of the cyclopentadiene monomer in said dimerization zone being from 3 to 30 minutes, whereby at least 50 percent of said monomer is converted to its dimer and thereafter cooling said reaction product to a temperature of less than 110° C. whereby at least 90 percent of said monomer is converted to its dimer and whereby the formation of cyclopentadiene polymers higher than the dimer is minimized.

15. The process as claimed in claim 14 wherein said cyclopentadiene monomer is cyclopentadiene.

16. The process as claimed in claim 14 wherein said heat exchange medium is water.

References Cited by the Examiner

UNITED STATES PATENTS 2,813,135   11/57   Johnson et al. _____ 260—666

FOREIGN PATENTS 803,308   10/58   Great Britain.

DANIEL E. WYMAN, *Primary Examiner.*

ALPHONSO D. SULLIVAN, *Examiner.*